US011993700B2

(12) United States Patent
van Egmond

(10) Patent No.: US 11,993,700 B2
(45) Date of Patent: May 28, 2024

(54) CATALYST SYSTEM FOR THE PRODUCTION OF POLYOLEFINS AND METHOD OF MAKING AND USING SAME

(71) Applicant: W.R. Grace & Co.-CONN., Columbia, MD (US)

(72) Inventor: Jan Willem van Egmond, Charleston, WV (US)

(73) Assignee: W.R. Grace & Co.—CONN., Columbia, MD (US)

( * ) Notice: Subject to any disclaimer, the term of this patent is extended or adjusted under 35 U.S.C. 154(b) by 22 days.

(21) Appl. No.: 17/561,234

(22) Filed: Dec. 23, 2021

(65) Prior Publication Data

US 2022/0119632 A1 Apr. 21, 2022

Related U.S. Application Data

(62) Division of application No. 16/329,548, filed as application No. PCT/US2017/049357 on Aug. 30, 2017, now Pat. No. 11,236,222.

(60) Provisional application No. 62/381,070, filed on Aug. 30, 2016.

(51) Int. Cl.
| | | |
|---|---|---|
| C08L 23/12 | (2006.01) | |
| C08F 10/06 | (2006.01) | |
| C08F 110/06 | (2006.01) | |
| C08L 23/16 | (2006.01) | |
| C08L 67/00 | (2006.01) | |
| C09D 123/12 | (2006.01) | |
| H01G 2/10 | (2006.01) | |

(52) U.S. Cl.
CPC .............. *C08L 23/12* (2013.01); *C08F 10/06* (2013.01); *C08F 110/06* (2013.01); *C08L 23/16* (2013.01); *C08L 67/00* (2013.01); *C09D 123/12* (2013.01); *H01G 2/10* (2013.01); *C08F 2410/01* (2013.01); *C08L 2205/025* (2013.01)

(58) Field of Classification Search
CPC .......... C08L 23/12; C08F 10/06; C08F 110/06
See application file for complete search history.

(56) References Cited

U.S. PATENT DOCUMENTS

| | | | |
|---|---|---|---|
| 4,622,358 A | 11/1986 | Pennewiss et al. | |
| 4,657,883 A | 4/1987 | Arzoumanidis et al. | |
| 5,432,244 A | 7/1995 | Rebhan | |
| 5,573,840 A | 11/1996 | Inoue et al. | |
| 6,153,549 A | 11/2000 | Hubscher et al. | |
| 7,491,670 B2 | 2/2009 | Chen et al. | |
| 8,916,644 B2 | 12/2014 | Tamura et al. | |
| 9,181,423 B2 | 11/2015 | Kock et al. | |
| 10,221,261 B2 | 3/2019 | Galvan et al. | |
| 2009/0203863 A1 | 8/2009 | Chen | |
| 2009/0312507 A1 | 12/2009 | Standaert et al. | |
| 2010/0324225 A1 | 12/2010 | Zummallen | |
| 2011/0034649 A1 | 2/2011 | Standaert et al. | |
| 2011/0130530 A1 | 6/2011 | Coalter et al. | |
| 2013/0109789 A1 | 5/2013 | Hamaki et al. | |
| 2014/0142241 A1 | 5/2014 | Chou | |
| 2016/0244538 A1 | 8/2016 | Liu et al. | |

FOREIGN PATENT DOCUMENTS

| | | | |
|---|---|---|---|
| CN | 1856514 A | 11/2006 | |
| CN | 101421318 A | 4/2009 | |
| CN | 103044593 A | 4/2013 | |
| CN | 103103038 A | 5/2013 | |
| CN | 103382234 A | 11/2013 | |
| CN | 103403038 A | 11/2013 | |
| CN | 105121483 A | 12/2015 | |
| EA | 201000766 A1 | 12/2010 | |
| EP | 0790257 A1 * | 8/1997 | ............. C08F 4/658 |
| EP | 1 586 589 A1 | 10/2005 | |
| EP | 2 702 418 A1 | 3/2014 | |
| EP | 2 902 418 | 8/2015 | |
| GB | 0 568 102 A | 3/1945 | |
| JP | H06-236709 A | 8/1994 | |
| JP | 2008-500439 A | 1/2008 | |
| JP | 2008-133351 A | 6/2008 | |
| JP | 2012-500320 A | 1/2012 | |
| JP | 2012-188477 A | 10/2012 | |
| JP | 2013-147601 | 8/2013 | |
| JP | 2014-525969 A | 10/2014 | |

(Continued)

OTHER PUBLICATIONS

Di Noto, et al., High Yield MgCL2-supported catalysts for propene polymerization: effects of ethyl propionate as internal donor on the activity and sterospecificity, Macromol. Chem. Phys. 199, 633-640 (1998).
Hong, Dingyi, Editor, Polypropylene-Mechanism, Process and Technology, published Sep. 1, 2002, ISBN 7-80164-258-9, 4 pages.
International Search Report and Written Opinion in International Application No. PCT/US2017/049357, dated Mar. 5, 2019, 10 pages.
Non-Final Office Action on U.S. Appl. No. 16/329,586 dated Jul. 18, 2022.
Examination Report dated Jul. 24, 2023 from Columbia Patent Application No. NC2022/0014894, 10 pages.

(Continued)

*Primary Examiner* — Catherine S Branch
(74) *Attorney, Agent, or Firm* — Foley & Lardner LLP

(57) ABSTRACT

Catalyst systems for polymerization of mixtures comprising an olefin include a selectivity control agent comprising at least one silicon-containing compound containing at least one C1-C10 alkoxy group bonded to a silicon atom and an amount of one or more agent compounds. The agent compound comprises C2-C13 mono- or polycarboxylic esters of aliphatic C2-C7 carboxylic acids and inertly substituted derivatives thereof. One or more polymerization catalysts may also be present. A polymerization process includes contacting an olefin or a mixture of the olefin and one or more copolymerizable comonomers under polymerization conditions with the catalyst composition.

8 Claims, No Drawings

(56) References Cited

FOREIGN PATENT DOCUMENTS

| | | | |
|---|---|---|---|
| JP | 2016-514759 A | 5/2016 |
| KR | 10-2004-0091007 | 10/2004 |
| KR | 10-2010-0061502 A | 6/2010 |
| KR | 1020130001770 | 9/2013 |
| KR | 10-2013-0132552 | 12/2013 |
| KR | 10-2014-0043801 A | 4/2014 |
| KR | 10-2016-0065181 A | 6/2016 |
| RU | 2497834 C2 | 11/2013 |
| WO | WO-2005/030815 A1 | 4/2005 |
| WO | WO-2007/122240 A1 | 11/2007 |
| WO | WO-2009/077467 A1 | 6/2009 |
| WO | WO-2012/087535 A1 | 6/2012 |
| WO | WO-2013/041470 A1 | 3/2013 |
| WO | WO-2013/127707 A1 | 9/2013 |
| WO | WO-2014/023603 A1 | 2/2014 |
| WO | WO-2014/166779 A1 | 10/2014 |
| WO | WO-2015/043526 A1 | 4/2015 |
| WO | WO-2015/075054 A1 | 5/2015 |
| WO | WO-2015/081254 A1 | 6/2015 |
| WO | WO-2016/066446 A1 | 5/2016 |

OTHER PUBLICATIONS

Foreign Office Action on KR patent application No. 10-2019-7007835 dated Jun. 5, 2023.
Decision of Refusal on JP Application No. 2019-531592 dated Mar. 7, 2022 (English translation included, 14 pages).
Decision to Grant on RU Application No. 2019109042 dated Feb. 15, 2022 (English translation included, 15 pages).
Examination Report on IN Application No. 201917007473 dated Jan. 27, 2021 (English translation included, 10 pages).
Examination Report on IN Application No. 201917007848 dated Jan. 22, 2021 (English translation included, 6 pages).
Extended European Search Report on EP Application No. 17847458.1 dated Jun. 8, 2020 (16 pages).
Extended European Search Report on EP Application No. 17847466.4 dated May 7, 2020 (9 pages).
First Office Action on CN Application No. 201780064763.4 dated May 14, 2021 (English translation included, 28 pages).
First Office Action on CN Application No. 201780065194.5 dated Oct. 28, 2020 (English translation included, 12 pages).
First Office Action on CO Application No. NC2019/0001885 dated Aug. 21, 2020 (English translation included, 16 pages).
First Office Action on SA Application No. 519401212 dated Mar. 23, 2022 (English translation included, 13 pages).
First Office Action on VN Application No. 1-2019-01033 dated Mar. 29, 2022 (English translation included, 3 pages).
First Written Opinion on SG Application No. 11201901662U dated Mar. 3, 2020 (9 pages).
International Preliminary Report on Patentability on International Application No. PCT/US2017/049377 dated Mar. 5, 2019 (7 pages).
International Search Report and Written Opinion on International Application No. PCT/US2017/049377 dated Nov. 3, 2017 (8 pages).
International Search Report and Written Opinion on International Application No. PCT/US2017/049357 dated Nov. 3, 2017 (11 pages).
Notice of Reasons for Refusal on JP Application No. 2019-531590 dated May 17, 2021 (English translation included, 8 pages).
Notice of Reasons for Refusal on JP Application No. 2019-531592 dated Apr. 19, 2021 (English translation included, 12 pages).
Notification of Reason for Refusal on KR Application No. 10-2019-7007835 dated Feb. 2, 2022 (English translation included, 15 pages).
Notification of Reason for Refusal on KR Application No. 10-2019-7007836 dated Feb. 2, 2022 (English translation included, 14 pages).
Office Action and Search Report on RU Application No. 2019109042 dated Dec. 9, 2020 (English translation included, 18 pages).
Office Action and Search Report on RU Application No. 2019109043 dated Apr. 30, 2021 (English translation included, 21 pages).
Office Action in RU Application No. 2019109042 dated Sep. 30, 2020 (English translation included, 9 pages).
Office Action on ID Application No. PID201901794 dated Feb. 25, 2021 (English translation included, 4 pages).
Office Action on ID Application No. PID201901802 dated Mar. 4, 2021 (English translation included, 4 pages).
Office Action on RU Application No. 2019109042 dated Jun. 28, 2021 (English translation included, 14 pages).
Office Action on RU Application No. 2019109043 dated Jan. 18, 2022 (English translation included, 17 pages).
Office Action on SA Application No. 519401213 dated Nov. 28, 2021 (English translation included, 11 pages).
Partial Supplementary European Search Report on EP Application No. 17847458.1 dated Mar. 27, 2020 (15 pages).
Preliminary Office Action and Search Report on BR Application No. 112019003864-7 dated Aug. 31, 2021 (English translation included, 9 pages).
Second Office Action on CN Application No. 201780065194.5 dated Aug. 20, 2021 (English translation included, 21 pages).
Second Office Action on CO Application No. NC2019/0001885 dated Feb. 26, 2021 (English translation included, 15 pages).
Second Written Opinion on SG Application No. 11201901662U dated Sep. 1, 2020 (8 pages).
Third Office Action on CO Application No. NC2019/0001885 dated Feb. 18, 2022 (English translation included, 18 pages).
Third Written Opinion on SG Application No. 11201901662U dated Jan. 5, 2022 (7 pages).
Notice of Preliminary Rejection, from Korea Application No. 2019-7007835, dated Aug. 3, 2023, 8 pages.
Substantive Examination Report, MY PI2019001061, dated Dec. 6, 2023, 2 pages.

* cited by examiner

CATALYST SYSTEM FOR THE PRODUCTION OF POLYOLEFINS AND METHOD OF MAKING AND USING SAME

CROSS-REFERENCE TO RELATED PATENT APPLICATIONS

This application is a divisional application of U.S. patent application Ser. No. 16/329,548, filed on Feb. 28, 2019, which was filed as a U.S. National Phase Application under 35 U.S.C. § 371 of International Application No. PCT/US2017/049357, filed Aug. 30, 2017, which claims the benefit of priority to U.S. Provisional Application No. 62/381,070, filed on Aug. 30, 2016, all of which are incorporated herein by reference in their entirety.

FIELD

The present invention is generally related to the field of polyolefin synthesis, and more particularly, compositions and catalyst systems for the polymerization of olefins.

BACKGROUND

Commercially, polyolefins are synthesized using Ziegler-Natta polymerization catalyst systems. These systems typically include a chemical species with a transition metal component and halide components, along with an optional internal electron donor. Additionally, these systems may include a co-catalyst, one or more selectivity control agents (SCA), and one or more activity limiting agents (ALA). Certain SCA and ALA, as well as their functionality in polymerization systems, were described in U.S. Pat. No. 7,491,670, the contents of which is incorporated herein by reference.

In many applications, low volatile organic compound (VOC) levels are preferred, and in some instances, mandated by various governmental bodies. Indeed, high VOC levels are disfavored for health, organoleptic, and environmental reasons. However, many known ALA constituents and their decomposition products may be contained in the final polyolefin product, may contribute to the VOC levels of that final product, and have traditionally been difficult to purge from the final product before it is used in consumer goods.

Therefore, a need exists for a polymerization catalyst system that minimizes the introduction of VOCs.

SUMMARY

In an attempt to overcome the noted deficiencies, aspects of the present invention are directed toward catalyst systems for polymerization of mixtures comprising an olefin.

The present invention is premised on the realization that lower VOC values are obtainable using certain low carbon-containing esters as ALAs in olefin polymerization catalyst systems. A first embodiment of the invention is directed to catalyst systems for polymerization of mixtures comprising an olefin. The catalyst system includes a selectivity control agent comprising at least one silicon-containing compound containing at least one C1-C10 alkoxy group bonded to a silicon atom and an amount of one or more agent compounds, said agent compound comprising C2-C13 mono- or polycarboxylic esters of aliphatic C2-C7 carboxylic acids and inertly substituted derivatives thereof.

The same or a different embodiment is directed toward catalyst systems for polymerization of mixtures comprising an olefin. The catalyst system includes one or more polymerization catalysts, a selectivity control agent comprising at least one silicon-containing compound containing at least one C1-C10 alkoxy group bonded to a silicon atom, and an amount of one or more agent compounds, said agent compound comprising C2-C13 mono- or polycarboxylic esters of aliphatic C2-C7 carboxylic acids and inertly substituted derivatives thereof.

A further embodiment of the invention is directed to a polymerization process. The process includes contacting an olefin or a mixture of the olefin and one or more copolymerizable comonomers under polymerization conditions with a catalyst system that includes one or more polymerization catalysts, a selectivity control agent comprising at least one silicon-containing compound containing at least one C1-C10 alkoxy group bonded to a silicon atom, and an amount of one or more agent compounds, said agent compound comprising C2-C13 mono- or polycarboxylic esters of aliphatic C2-C7 carboxylic acids and inertly substituted derivatives thereof.

The objects and advantages of the present invention will be further appreciated in light of the following detailed description and drawings provided herein.

DETAILED DESCRIPTION

Unless clearly defined otherwise from the context, any range of values presented in the following Detailed Description and Claims includes each end point as well as each whole number or fractional part thereof, within the recited range. Additionally, approximating language may be applied to modify any quantitative representation that may vary without resulting in a change in the basic function to which it is related. Accordingly, a value modified by a term or terms, such as "about" and "substantially," may not be limited to the precise value specified.

All references to the Periodic Table of the Elements refer to the Periodic Table of the Elements, published and copyrighted by CRC Press, Inc., 2001. Also, any reference to a Group or Groups shall be to the Group or Groups as reflected in this Periodic Table of the Elements using the IUPAC system for numbering groups. For purposes of United States patent practice, the contents of any patent, patent application, or publication referenced herein are hereby incorporated by reference in their entirety (or the equivalent US version thereof is so incorporated by reference) especially with respect to the disclosure of synthetic techniques, raw materials, and general knowledge in the art.

As used herein, the term "(poly)" means optionally more than one, or stated alternatively, one or more. By the term, "aliphatic or cycloaliphatic mono- or polycarboxylic acid" is meant a compound containing at least one carboxylic acid group whose carbon atom is bonded to a carbon atom that is not part of an aromatic ring system. The term "aromatic" refers to a polyatomic ring system containing (4n+2) π-electrons, wherein n is an integer greater than or equal to 1. The term "inert" or "inertly substituted" as used herein refers to groups or substituents that do not further interact with any other components or reagents used in the polymerization process or that do not interact in a manner that is significantly detrimental to the desired polymerization process.

For the purpose of this specification, the term "volatile organic compounds" or "VOC" means $C_{6-18}$ hydrocarbons comprising oligomers of $C_2$ and $C_3$ material, as well as any low molecular weight oils and in-process chemicals that are present. These can be measured by the method described below.

Unless stated to the contrary or conventional in the art, all parts and percents used herein are based on weight. The term "equivalent percent" is based on equivalents of ALA, which is mols of ALA multiplied by the number of carboxylate groups per molecule and equivalents of silane compound, which is mols of SCA multiplied by the number of silicon atoms that are bonded to one or more alkoxy groups per molecule respectively. The term "mixture" when used with respect to SCAs, for example, means the use of two or more SCA components, simultaneously during at least a portion of a polymerization. The individual SCAs may be added separately to a reactor or premixed and added to the reactor in the form of the desired mixture. In addition, other components of the polymerization mixture, including the procatalyst, may be combined with one or more of the SCAs of the mixture, and/or the procatalyst, cocatalyst and a portion of the monomer optionally may be prepolymerized prior to addition to the reactor. If multiple reactors are employed in a polymerization wherein the present SCA/ALA mixture is utilized, it is to be understood that different individual components of the SCA and ALA may be employed in either reactor and that the present mixture need not be employed in all reactors of the multiple reactor train. A similar understanding is to govern any other recitation of the term "mixture."

If appearing herein, the term "comprising," or derivatives thereof, is not intended to exclude the presence of any additional component, step, or procedure, whether or not the same is disclosed herein. In order to avoid any doubt, all compositions claimed herein through use of the term "comprising" may include any additional additive, adjuvant, or compound, unless stated to the contrary. The terms "comprising" and "including" (or derivatives thereof) are intended to be synonyms. In contrast, the term, "consisting essentially of" if appearing herein, excludes from the scope of any succeeding recitation any other component, step or procedure, excepting those that are not essential to operability. The term "consisting of," if used, excludes any component, step, or procedure not specifically delineated or listed. The term "or," unless stated otherwise, refers to the listed members individually as well as in any combination.

According to exemplary embodiments of the present invention, a composition is provided for use with a catalyst for polymerization of mixtures comprising an olefin. Examples of olefins that can be used in the polymerization are alpha-olefins having 2 to 20 carbon atoms such as ethylene, propylene, 1-butene, 4-methyl-1-pentene, 1-pentene, 1-octene, 1-hexene, 3-methyl-1-pentene, 3-methyl-1-butene, 1-decene, 1-tetradecene, 1-eicosene, and vinylcyclohexane. These alpha-olefins may be used individually or in any combinations as will be apparent to one of ordinary skill in the art given the present disclosure. The composition comprises an SCA comprising at least one silicon-containing compound containing at least one C1-C10 alkoxy group bonded to a silicon atom and one or more ALA compounds of C2-C13 mono- or polycarboxylic esters of aliphatic C2-C7 carboxylic acids and inertly substituted derivatives thereof. In the same or different embodiments, a catalyst composition is provided for polymerization of mixtures comprising an olefin. The catalyst composition includes a polymerization catalyst, an SCA, and an ALA. Similar catalyst compositions are disclosed in U.S. Pat. No. 7,491,670, the content of which is incorporated herein by reference.

Exemplary silicon-containing compounds for use as the SCA include alkoxysilanes. Suitable alkoxysilanes for use in the mixture of SCAs herein are compounds having the general formula: $SiR_m(OR')_{4-m}$ where R independently on each occurrence is hydrogen or a hydrocarbyl or an amino group optionally substituted with one or more substituents containing one or more Group 14, 15, 16, or 17 heteroatoms, said R containing up to 20 atoms not counting hydrogen and halogen; R' is a C1-C10 alkyl group; and m is 0, 1, 2 or 3. For instance, R may be C6-C12 aryl, alkyl or aralkyl, C3-C12 cycloallyl, C3-C12 branched alkyl, or C3-C12 cyclic amino group, R' may be C1-C4 allyl, and m may be 1 or 2. Examples of alkoxysilane SCAs for use herein include: dicyclopentyldimethoxysilane, di-tert-butyldimethoxysilane, methylcyclohexyldimethoxysilane, ethylcyclohexyldimethox-ysilane, diphenyldimethoxysilane, diisopropyldimethoxysilane, di-n-propyldimethoxysilane, diisobutyldimethoxysilane, di-n-butyldimethoxysilane, cyclopentyltrimethoxysilane, isopropyltrimethoxysilane, n-propyltrimethoxysilane, n-propyltriethoxysilane, ethyltriethox-ysilane, tetramethoxysilane, tetraethoxysilane, cyclopentylpyrrolidinodimethoxysilane, bis(pyrrolidino)dimethoxy-silane, and bis(perhydroisoquinolino)dimethoxysilane.

The total molar quantity of the SCA mixture employed based on moles of transition metal of the polymerization catalyst is desirably from 0.1 to 500 or from 0.5 to 100 or from 1 to 50.

The ALA may be compounds of C2-C13 mono- or polycarboxylic esters of aliphatic C2-C7 carboxylic acids and inertly substituted derivatives thereof. For instance, the ALA may include an acetate ester, a propanoate ester, a butyrate ester, a valerate ester, or a hexanoate ester. Suitable esters may include butyl valerate (BV), isobutyl butyrate (iBB), propyl butyrate (PB), pentyl valerate (PV), isopropyl butyrate (iPB), octyl acetate (OA), pentyl acetate (PA), propyl acetate (PrA), pentyl hexanoate (PH), and combinations thereof.

Such esters are used in an effort to lower the VOC content of the final product. These esters and their decomposition products may be purged from the system during the processing of the polymer, such as during or after an extrusion step, for example. Additionally, these esters typically exhibit fruity or otherwise pleasant odors, and some are considered safe, even for food-based applications. Nonetheless, because these esters and their decomposition products are purged from the system, the final consumer product may not exhibit such odors, and the esters may be substantially absent from the final product.

With respect to quantity of ALA, the corresponding molar ratio based on moles of the transition metal of the polymerization catalyst may be from 1 to 10,000 or from 2 to 1000 or from 5 to 100.

Exemplary SCA/ALA mixtures according to embodiments of the invention may be those comprising from 1 to 99.9, or from 30 to 99, or from 50 to 98 molar percent of one or more ALA compounds, and correspondingly from 99 to 0.1, or from 70 to 1, or from 50 to 2 molar percent of one or more SCA compounds. For example, the SCA/ALA molar ratio may be about 10 mol %/90 mol % or about 40 mol %/60 mol %.

When a polymerization catalyst is present, exemplary catalysts include Ziegler-Natta catalyst systems. Ziegler-Natta procatalysts for use in the present invention comprise a solid complex derived from a transition metal compound, for example, titanium-, zirconium-, chromium- or vanadium-hydrocarbyloxides, hydrocarbyls, halides, or mixtures thereof; and a Group 2 metal compound, such as a magnesium halide. In some embodiments, the precursors comprise a mixture of titanium halides supported on magnesium halide compounds.

Any of the conventional Ziegler-Natta, transition metal compound containing procatalysts can be used in the present invention. The procatalyst component of a conventional Ziegler-Natta catalyst may contain a transition metal compound of the general formula $TrX_x$ where Tr is the transition metal, X is a halogen or a C1 to C10 hydrocarboxyl or hydrocarbyl group, and x is the number of such X groups in the compound, in combination with the foregoing Group 2 metal compound. For example, Tr may be a Group 4, 5 or 6 metal. In certain embodiments, Tr may be a Group 4 metal, such as titanium. X may be, for example, chloride, bromide, C1 to C4 alkoxide or phenoxide, or a mixture thereof. For example, X may be chloride.

Illustrative examples of suitable transition metal compounds that may be used to form a Ziegler-Natta procatalyst are $TiCl_4$, $ZrCl_4$, $TiBr_4$, $TiCl_3$, $Ti(OC_2H_5)_3Cl$, $Zr(OC_2H_5)_3Cl$, $Ti(OC_2H_5)_3Br$, $Ti(OC_3H_7)_2Cl_2$, $Ti(OC_6H_5)_2Cl_2$, $Zr(OC_2H_5)_2Cl_2$, and $Ti(OC_2H_5Cl_3$. Mixtures of such transition metal compounds may be used as well. No restriction on the number of transition metal compounds is made as long as at least one transition metal compound is present. In certain embodiments, the transition metal compound is a titanium compound.

Examples of suitable Group 2 metal compounds include magnesium halides, such as magnesium chloride for example, dialkoxymagnesiums, alkoxymagnesium halides, magnesium oxyhalides, dialkylmagnesiums, magnesium oxide, magnesium hydroxide, carboxylates of magnesium, magnesium chloride adducts, and carboxylated magnesium dialkoxides or aryloxides. For example, the Group 2 metal compound may be magnesium dichloride or magnesium di(C1-C4)alkoxides, such as diethoxymagnesium.

Additionally, the procatalysts may comprise titanium moieties. Suitable sources of titanium moieties include titanium alkoxides, titanium aryloxides, and/or titanium halides. In certain embodiments, compounds used to prepare the procatalysts may comprise one or more magnesium-di(C1-C4)alkoxides, magnesium dihalides, magnesiumalkoxy-handes, or mixtures thereof and one or more titanium tetra($C_{1-4}$) alkoxides, titanium tetrahalides, titanium ($C_{1-4}$) alkoxyhalides, or mixtures thereof.

Exemplary Ziegler-Natta procatalysts that may be used in the present invention are disclosed in U.S. Pat. Nos. 4,927,797; 4,816,433; 4,839,321; 8,288,585; and 8,536,372, the contents of which are incorporated herein by reference. A procatalyst is described therein comprising a solid catalyst component obtained by (i) suspending a dialkoxy magnesium in an aromatic hydrocarbon that is liquid at normal temperatures, (ii) contacting the dialkoxy magnesium with a titanium halide, and further (iii) contacting the resulting composition a second time with the titanium halide, and contacting the dialkoxy magnesium with a diester of an aromatic dicarboxylic acid at some point during the treatment with the titanium halide in (ii).

Various methods of making precursor compounds used to prepare the present procatalysts are known in the art. These methods are described, for example, in U.S. Pat. Nos. 5,034,361; 5,082,907; 5,151,399; 5,229,342; 5,106,806; 5,146,028; 5,066,737; 5,077,357; 4,442,276; 4,540,679; 4,547,476; 4,460,701; 4,816,433; 4,829,037; 4,927,797; 4,990,479; 5,066,738; 5,028,671; 5,153,158; 5,247,031; 5,247,032, the contents of all of which are incorporated herein by reference; and elsewhere. In certain embodiments, the preparation involves chlorination of the foregoing mixed magnesium compounds, titanium compounds, or mixtures thereof, and may involve the use of one or more compounds, referred to as "clipping agents," that aid in forming or solubilizing specific compositions via a solid/solid metathesis. Examples of suitable clipping agents include trialkylborates, for example triethylborate, phenolic compounds, for example cresol, and silanes.

An exemplary precursor for use herein is a mixed magnesium/titanium compound of the formula $Mg_dTi(OR^e)_eX_f$ wherein $R^e$ is an aliphatic or aromatic hydrocarbon radical having 1 to 14 carbon atoms or COR' wherein R' is an aliphatic or aromatic hydrocarbon radical having 1 to 14 carbon atoms; each $OR^e$ group is the same or different; X is independently chlorine, bromine or iodine; d is 0.5 to 5, or 2-4, or 3; e is 2-12, or 6-10, or 8; and f is 1-10, or 1-3, or 2. The precursors, having a desirable morphology and surface area, may be prepared by controlled precipitation through removal of an alcohol from the reaction mixture used in their preparation. An exemplary reaction medium comprises a mixture of an aromatic liquid, for example a chlorinated aromatic compound, such as chlorobenzene, with an alkanol, such as ethanol, and an inorganic chlorinating agent. Suitable inorganic chlorinating agents include chlorine derivatives of silicon, aluminum, and titanium, such as titanium tetrachloride or titanium trichloride. The resulting precursors may have a uniform particle size and may be resistant to particle crumbling and degradation of the resulting procatalyst.

The precursor may next be converted to a solid procatalyst by further reaction (halogenation) with an inorganic halide compound, such as a titanium halide compound, and incorporation of an internal electron donor. If not already incorporated into the precursor in sufficient quantity, the electron donor may be added separately before, during, or after halogenation. This procedure may be repeated one or more times, optionally in the presence of additional additives or adjuvants, and the final solid product may be washed with an aliphatic solvent.

A suitable method for halogenation of the precursor may be by reacting the precursor at an elevated temperature with a tetravalent titanium halide, optionally in the presence of a hydrocarbon or halohydrocarbon diluent. An exemplary tetravalent titanium halide is titanium tetrachloride. The optional hydrocarbon or halohydrocarbon solvent employed in the production of the olefin polymerization procatalyst may contain up to 12 carbon atoms inclusive, such as up to 9 carbon atoms inclusive. Exemplary hydrocarbons include pentane, octane, benzene, toluene, xylene, alkylbenzenes, and decahydronaphtha-lene. Exemplary aliphatic halohydrocarbons include methylene chloride, methylene bromide, chloroform, carbon tetrachloride, 1,2-dibromoethane, 1,1,2-trichloroethane, trichlorocyclohexane, dichlorofluoromethane and tetrachiorooctane. Exemplary aromatic halohydrocarbons include chlorobenzene, bromobenzene, dichlorobenzenes and chlorotoluenes. In certain embodiments, the aliphatic halohydrocarbon may be compounds containing at least two chloride substituents, such as carbon tetrachloride and 1,1,2-trichloroethane. In certain embodiments, the aromatic halohydrocarbon may be chlorobenzene and/or o-chlorotoluene.

The halogenation may be repeated one or more times, optionally accompanied by washing with an inert liquid such as an aliphatic or aromatic hydrocarbon or halohydrocarbon between halogenations and following the final halogenation. Further, optionally one or more extractions involving contacting with an inert liquid diluent, such as an aliphatic or aromatic hydrocarbon, optionally at an elevated temperature greater than 100° C., such as greater than 110° C., may be employed to remove labile species, such as $TiCl_4$.

The foregoing are exemplary methods of making the solid procatalyst, and any method of making, recovering and storing the solid procatalyst may be suitable for use in the present invention.

In addition to the SCA and ALA compounds described above, internal electron donors may be used in the present catalyst compositions to help provide tacticity control and catalyst crystallite sizing. Exemplary internal electron donors include substituted phenylene aromatic diesters, halides, or anhydrides or (poly)alkyl ether derivatives thereof. For example, the internal electron donors may be C1-C4 dialkyl esters of phthalic or terephthalic acid, phthaloyl dichloride, phthalic anhydride, and/or C1-C4 (poly) alkyl ether derivatives thereof. In certain embodiments, the internal electron donor is diisobutyl phthalate or di-n-butyl phthalate.

The Ziegler-Natta transition metal catalyst may also include an inert support material, if desired. The support may be an inert solid which does not adversely alter the catalytic performance of the transition metal compound. Examples may include metal oxides, such as alumina, and metalloid oxides, such as silica.

Cocatalysts for use with the foregoing Ziegler-Natta catalysts according to certain embodiments of the invention may include aluminum-containing compounds, such as organoaluminum compounds for example. Exemplary organoaluminum compounds include trialkylaluminum-, dialkylaluminum hydride-, alkylaluminum dihydride-, dialkylaluminum halide-, alkylaluminumdihalide-, dialkylaluminum alkoxide-, and alkylaluminum dialkoxide-compounds containing from 1-10 carbon atoms, or from 1-6 carbon atoms, in each alkyl- or alkoxide-group. Exemplary cocatalysts include C1-C4 trialkylaluminum compounds, such as triethylaluminum (TEA1).

A further aspect of the invention is directed to a polymerization process. The process includes contacting an olefin or a mixture of the olefin and one or more copolymerizable comonomers under polymerization conditions with a catalyst system that includes one or more polymerization catalysts, a selectivity control agent comprising at least one silicon-containing compound containing at least one C1-C10 alkoxy group bonded to a silicon atom, and one or more activity limiting agent compounds of C2-C13 mono- or polycarboxylic esters of aliphatic C2-C7 carboxylic acids and inertly substituted derivatives thereof.

In one embodiment, a mixture of olefins is copolymerized. In another embodiment, one olefin (e.g., propylene or 1-butene) is homopolymerized. In the homopolymerization of these olefins, a polyunsaturated compound such as conjugated diene or non-conjugated diene may be used as a comonomer. Non-limiting examples of copolymerizable comonomers include styrene, butadiene, acrylonitrile, acrylamide, alpha-methyl styrene, chlorostyrene, vinyl toluene, divinyl benzene, diallyphthalate, alkyl methacrylates and alkyl acrylates. In one embodiment, the comonomers include thermoplastic and elastomeric monomers.

The polymerization of an olefin is typically carried out in the gaseous or liquid phase. In one embodiment, the polymerization employs a catalyst system containing the solid catalyst component in an amount from about 0.001 to about 0.75 millimoles calculated as Ti atom per liter of the volume of the polymerization zone, the organoaluminum compound in an amount from about 1 to about 2,000 moles per mole of Ti atoms in the solid catalyst component, and the organosilicon compound in an amount from about 0.001 to about 10 moles calculated as Si atoms in the organosilicon compound per mole of the metal atoms in the organoaluminum compound.

The use of hydrogen at the time of polymerization promotes and contributes to control of the molecular weight of the resulting polymer, and the polymer obtained may have a desirable melt flow rate. The catalyst productivity of the catalyst system and low residue and ash content of the resulting polymer are improved when the methods and systems of the presently disclosed invention are utilized.

In one embodiment, the polymerization temperature in the polymerization is from about 20° C. to about 200° C. In another embodiment, the polymerization temperature in the polymerization is from about 50° C. to about 180° C.

In one embodiment, the polymerization pressure in the polymerization is typically from atmospheric pressure to about 100 $kg/cm^2$. In another embodiment, the polymerization pressure in the polymerization is typically from about 2 $kg/cm^2$ to about 50 $kg/cm^2$.

The polymerization process may occur within a fluidized-bed reactor containing a fluidized bed comprising the catalyst system described above. The polymerization may be carried out batchwise, semi-continuously, or continuously. The polymerization may also be carried out in two or more stages under different reaction conditions.

The olefin polymer so obtained may be a homopolymer, a random copolymer, a block copolymer, or an impact copolymer. The impact copolymer contains an intimate mixture of a polyolefin homopolymer and a polyolefin rubber. Examples of polyolefin rubbers include ethylene propylene rubber (EPR) and ethylene propylene diene monomer rubber (EPDM). The olefin polymer obtained by using the catalyst system has a very small amount of an amorphous polymer component and therefore a small amount of a hydrocarbon-soluble component. Accordingly, a film molded from the resultant polymer has low surface tackiness.

To compare the results of reactions performed under different conditions, a normalized polymerization activity ratio may be determined. The normalized polymerization activity ratio is defined as $A_{T1}/A_{T2}$, where $A_{T1}$ is the activity at temperature $T_1$ and $A_{T2}$ is the activity at a $T_2$ lower than $T_1$. This value can be used as an indicator of activity change as a function of temperature. For example, an $A_{100}/A_{67}$ equal to 0.30 shows that the catalyst activity at 100° C. is only 30 percent of the catalyst activity at 67° C. In some embodiments, $T_2$ may be 72° C.

Alternatively, the normalized polymerization activity may be defined as activity at the first temperature in the presence of the selectivity control agent, but not the activity limiting agent, at a same total molar quantity of the selectivity control agent. Further, the normalized polymerization activity may be defined as activity at the first temperature in the presence of the selectivity control agent, but not the activity limiting agent, at a molar quantity of the selectivity control agent required to produce similar xylene solubles at the second temperature as said composition at the second temperature.

Examples

Melt flow rate (MFR) was measured in accordance with the ASTM D 1238-01 test method at 230° C. with a 2.16 kg weight for propylene-based polymers. MF was expressed in grams of polymer per 10 minutes of duration of the test. MF ranges used in the examples are provided in Table 1.

Volatiles content (VOC) was measured by the static Headspace analysis described in the textbook: Pyrolysis and GC in Polymer Analysis, edited by S. A. Liebman and E. J. Levy, Marcel Dekker, Inc., 1985. The gas chromatography/headspace gas chromatography (GC-HS) analysis is widely used in the automotive industry. The company Volkswagen AG has developed a standard, which is generally accepted and used in the plastic industry, known as "VW standard PV 3341" (or "PV3341"). PV 3341 is a test in which a sample of 2 grams is placed into a headspace vial, conditioned for 5 hours at 120° C., and then injected into a gas chromatograph instrument. Quantification was accomplished using an external standard technique based on peak area response of acetone standards.

Determination of XS: A weighed amount of sample was dissolved in xylene under reflux conditions. The solution was then cooled under controlled conditions and maintained at a 25° C. equilibrium temperature so that the crystallization of the insoluble fraction could take place. When the solution was cooled, the insoluble portion precipitated and was isolated by filtration. The xylene was evaporated from the filtrate, leaving the soluble fraction in the residue. The percentage of this fraction in the polymer was determined gravimetrically. XS value ranges obtained in the Examples are provided in Table 1.

Ti Residuals by X-Ray Fluorescence: Molded polypropylene samples are irradiated by a chromium target x-ray tube. Excitations of the inner shell electrons of Ti produce a secondary emission with a wavelength characteristic of Ti and an intensity proportional to its concentration. The emission intensity is measured at a specific angle of diffraction from a dispersion crystal placed in the secondary beam. Measurements were conducted using a PANalytical (Philips) X-ray spectrometer.

Thermal decay test: Thermal decay tests were performed to determine the extent to which the external donor system prevents hot spots in the reactor. To perform the test, the reactor was run at baseline conditions at a typical operating temperature, such as 72° C., for example. Once the reactor stabilized at these baseline conditions, the production rate, $PR_0$, at 72° C. was determined from the amount of product produced over several hours. At a predetermined time, the reactor temperature was increased over a period of 0.5 hour to 90° C. and maintained at that temperature for 2.5 hours. During the 2.5 hour period at 90° C., an amount of product produced was weighed to determine the average production rate at 90° C., $PR_{90}$. After the 2.5 hour period at 90° C., the reactor temperature was increased again over a period of 0.5 hour to 100° C., and the weighing procedure was repeated at 100° C. This process was repeated for 110° C. and 120° C., as well. Once the instantaneous production rate of 120° C. was determined, the test was complete and the reactor was returned to normal operating conditions.

During the test, catalyst, TEA1, SCA, and ALA flows were kept constant. All other controllable reactor conditions, except those that control reactor temperature but including monomer partial pressures, were also kept constant during the test. Because the catalyst feed rate was kept constant during the test, the ratio a(T), of the catalyst activity A(T), at a temperature. T, to the baseline activity $A_0$, at baseline temperature $T_0$ (72° C.) may be given by equation (1).

$$a(T) = \frac{A(T)}{A_0} = \frac{PR_T}{PR_0} \quad (1)$$

Because the partial pressure was kept constant for the duration of the test, no corrections were needed when comparing catalyst activity at different temperatures. The thermal decay plot was then generated.

The thermal decay plot was generated by plotting the activity ratio a(T) at the different test temperatures versus the test temperature. Care was taken to ensure that the elevated temperatures and time intervals between temperature steps were the same for each set of tests.

Operability Index: The Operability Index is a dimensionless number that relates the ratio of the area under the high temperature steps ($T_2$=100° C., $T_3$=110° C., and $T_F$=120° C.) of the thermal decay plot to the temperature difference between the $T_F$ and $T_2$ temperatures. This relationship is given by equation (2).

$$\frac{\int_{T_2}^{T_F} a(T)dT}{T_F - T_2} \quad (2)$$

The calculation of the above ratio performed numerically using a Newton-Cotes trapezoidal rule is defined as the Operability Index. Thus, the Operability Index is given by equation (3).

$$OI \stackrel{def}{=} \frac{\left[\frac{a(T_2)}{2} + a(T_3) + \frac{a(T_F)}{2}\right]\Delta T}{T_F - T_2} \quad (3)$$

where the values of $a(T_i)$ and $T_i$ are obtained from the thermal decay test and is the temperature step of 10° C.

A lower operability index indicates more advantageous kinetic behavior of the catalyst composition in the sense that the catalyst composition tends to die off as the temperature increases and, therefore, tends to suppress the formation of hot spots. It has been found that to maintain acceptable reactor operability in a gas-phase fluidized bed reactor, the operability index, OI, should be less than or equal to 0.5. For a self-extinguishing catalyst system, the operability index should be less than or equal to 0.25.

General Procedure for the Synthesis of Polypropylene: Propylene, a Ziegler-Nana catalyst composition of a titanium compound and an organoaluminum co-catalyst, a mixed external electron donor (MEED) comprising a mixture of a silane SCA, and an alkyl ester ALA were introduced into a pilot plant sized reactor in accordance with Table 1 and allowed to react. The catalyst used in the polymerization for the examples was a supported Ziegler-Natta solid catalyst comprising Mg, Ti. A catalyst, cat0, was prepared with 3-methyl-5-tert butyl-1,2 phenylene dibenzoate as the internal electron donor for comparative examples CE1-CE8 and inventive examples IE1-IE10. A catalyst, cat1, was prepared with 4-cyclohexyl-3,6-dimethyl-1,2-phenylene dibenzoate as the internal electron donor for comparative example CE9 and inventive example IE11. The catalysts and their methods of preparation are described in U.S. Pat. No. 8,536,372, which is herein incorporated by reference. The solid catalyst was fed as a slurry in white mineral oil, which is sold under the tradename HYDROBRITE 380, and injected by means of a syringe pump and a propylene carrier flow of 4 pounds per hour into the side of a 14" diameter fluidized bed reactor. A carrier flow of 4 pounds per hour of propylene was used to feed and disperse the catalyst slurry into the reactor. As co-catalyst, TEA1 was fed to the reactor as a 2.5 wt % solution in isopentane in all examples. The MEED was fed as a 1 wt % solution in isopentane. For the silane SCA component in the MEED, n-propyltrimethoxysilane (NPTMS) was used. For the alkyl ester ALA component, isopropyl myristate (IPM) or no ALA was used in the comparative examples. Pentyl valerate (PV), octyl acetate (OA), or propyl hexanoate (PH) was used in the inventive examples. Compositions of the MEED used in each example are listed in the tables below. Catalyst productivity was determined from the Ti residuals measurement in the product via XRF, the Ti loading of the catalyst, and catalyst feed rate. The production rate was defined as the weight of product discharge by the reactor during a 3-hour period divided by 3.

For the inventive examples IE1, IE2, IE3, and IE4, a polypropylene product having a targeted nominal melt flow (MF) of 100 g/10 min and xylene solubles (XS) of 1 to 2 wt % was produced, isolated, and sampled using the reactor conditions listed in Table 1 below. Thermal decay tests were performed to determine the reactor operability, and headspace samples were collected for VOC measurement in accordance with VW standard PV 3341.

TABLE 1

| | | CE1 | CE2 | CE3 | CE4 | CE5 | IE1 | IE2 | IE3 | IE4 |
|---|---|---|---|---|---|---|---|---|---|---|
| Preparation of the polypropylene homopolymer examples | | | | | | | | | | |
| Catalyst Feed Rate | [cc/hr] | 1.4 | 1.9 | 1.5 | 0.8 | 1.7 | 1.2 | 1.4 | 1.4 | 1.9 |
| Catalyst Slurry Solids | [wt %] | 30.8 | 27.0 | 27.6 | 29.8 | 27.6 | 28.1 | 28.1 | 28.1 | 27.0 |
| Catalyst Ti Loading | [wt %] | 4.3 | 4.2 | 4.1 | 4.6 | 4.1 | 4.1 | 4.1 | 4.1 | 4.2 |
| Reactor Temperature | [° C.] | 72 | 72 | 72 | 72 | 72 | 72 | 72 | 72 | 72 |
| Total Pressure | [psi] | 423 | 424 | 422 | 421 | 423 | 423 | 423 | 423 | 423 |
| C3 Partial Pressure | [psi] | 321 | 320 | 320 | 320 | 320 | 320 | 320 | 320 | 320 |
| Bed Weight | [kg] | 33.0 | 31.7 | 31.7 | 21.2 | 31.2 | 33.5 | 32.7 | 32.8 | 30.9 |
| Residence Time | [hr] | 2.2 | 2.1 | 2.4 | 1.2 | 2.4 | 2.1 | 2.2 | 2.1 | 2.1 |
| Superficial Gas Velocity | [m/s] | 0.40 | 0.38 | 0.37 | 0.34 | 0.34 | 0.41 | 0.40 | 0.40 | 0.37 |
| H2/C3 | [mol/mol] | 0.079 | 0.080 | 0.057 | 0.010 | 0.061 | 0.080 | 0.083 | 0.080 | 0.083 |
| Alkyl Type | | TEA1 | TEA1 | TEA1 | TEA1 | TEA1 | TEA1 | TEA1 | TEA1 | TEA1 |
| MEED Type | [ALA/SCA] | IPM/NPTMS | IPM/NPTMS | —/NPTMS | IPM/NPTMS | IPM/NPTMS | PV/NPTMS | OA/NPTMS | PH/NPTMS | OA/NPTMS |
| ALA/SCA Molar Ratio | [mol/mol] | 60/40 | 60/40 | 0/100 | 98/2 | 98/2 | 90/10 | 90/10 | 90/10 | 90/10 |
| TEA1 Concentration | [wt %] | 2.5 | 2.5 | 2.5 | 2.5 | 2.5 | 2.5 | 2.5 | 2.5 | 2.5 |
| TEA1 Feed Rate | [cc/hr] | 113 | 173 | 133 | 87 | 148 | 108 | 126 | 126 | 168 |
| TEA1/Ti Feed Ratio | [mol/mol] | 36 | 50 | 49 | 50 | 49 | 50 | 50 | 50 | 50 |
| TEA1/MEED Feed Ratio | [mol/mol] | 3.8 | 3.8 | 7.3 | 2.5 | 2.0 | 3.8 | 3.8 | 3.8 | 3.2 |
| MEED Concentration | [wt %] | 1.0 | 1.0 | 1.0 | 1.0 | 1.0 | 1.0 | 1.0 | 1.0 | 1.0 |
| MEED Feed Rate | [cc/hr] | 155 | 225 | 60 | 101 | 439 | 107 | 125 | 115 | 197 |
| Production Rate | [kg/hr] | 15 | 15 | 13 | 17 | 14 | 16 | 15 | 16 | 15 |
| Catalyst Productivity | [kg/kg] | 51,427 | 38,532 | 58,041 | 53,953 | 38,412 | 61,342 | 45,666 | 55,540 | 33,600 |
| Melt Flow | [g/10 min] | 86.2 | 94.8 | 45.8 | 2.2 | 44.9 | 103.1 | 97.7 | 95.0 | 97.0 |
| Xylene Solubles | [wt %] | 1.7 | 1.5 | 1.7 | 2.6 | 1.7 | 1.9 | 1.5 | 1.8 | 1.9 |
| Ethylene Content | [wt %] | | | | | | | | | |
| Ti Residuals | [ppm] | 0.8 | 1.1 | 0.7 | 0.9 | 1.1 | 0.7 | 0.9 | 0.7 | 1.3 |
| VOC by PV 3341 of the polypropylene homopolymer examples | | | | | | | | | | |
| VOC | [ppm] | | 85 | 68 | | 158 | 58 | 50 | 45 | 47 |
| VOC Reduction | [%] | | | | | | 32% | 41% | 47% | 45% |

TABLE 2

|  | CE1 | CE4 | IE1 | IE2 | IE3 |
|---|---|---|---|---|---|
| a(72° C.) | 1.00 | 1.00 | 1.00 | 1.00 | 1.00 |
| a(90° C.) | 0.82 | 0.29 | 0.84 | 1.00 | 0.64 |
| a(100° C.) | 0.66 | 0.37 | 0.49 | 0.70 | 0.64 |
| a(110° C.) | 0.43 | 0.40 | 0.13 | 0.37 | 0.55 |
| a(120° C.) | 0.25 | 0.28 | 0.00 | 0.07 | 0.19 |
| OI | 0.44 | 0.36 | 0.19 | 0.38 | 0.48 |

The external donors containing isopropyl myristate as ALA are commercially available and were examined as comparative examples. In the inventive systems, pentyl valerate, octyl acetate, and propylhexanote exhibited excellent operability. However, the inventive systems provided much lower VOC levels than all the comparative examples, as can be seen from the VOC results measured in accordance with Volkswagen method PV 3341 reported in Table 1. Note that, generally, VOC level is dependent on the melt flow and is known to increase with increasing melt flow. Therefore, for proper comparison, only comparative examples and inventive examples with similar melt flow should be compared. Thus, IE1, IE2, IE3, and IE4 should be compared to CE2. However, it should also be noted that even those comparative examples with lower melt flows, such as CE3 and CE5, have higher VOC levels than the inventive examples.

Table 2 provides a summary of the thermal decay tests and provided results in the form of an OI. As can be seen, all inventive systems (IE1, IE2, and IE3) performed similar to, or better than, the comparative systems in CE1 and CE4 in terms of the OI. CE4 is a commercial system commonly used in the manufacture of a wide range of homopolymers.

For the inventive examples IE6 and IE7, a polypropylene product having a targeted nominal MF of 200 g/10 min and XS of 1 to 2 wt % was produced, isolated, and sampled using the reactor conditions listed in Table 3. Headspace samples were collected for VOC measurements in accordance with VW standard PV 3341. As shown in Table 3, a wide range of melt flows of at least up to 200 g/10 min was obtainable using octyl acetate or propyl hexanoate as the ALA and with a low VOC level of only 49 ppm versus 159 ppm for the comparative example CE6, a reduction of 69%. Further, a very low VOC level of 22 ppm was obtainable with the OA/NPTMS system reported in IE5.

TABLE 3

|  |  | CE6 | CE7 | IE5 | IE6 | IE7 |
|---|---|---|---|---|---|---|
| Preparation of the polypropylene homopolymer examples | | | | | | |
| Reactor 1 Conditions | | | | | | |
| Catalyst Feed Rate | [cc/hr] | 1.1 | 2.3 | 1.2 | 1.4 | 1.4 |
| Catalyst Slurry Solids | [wt %] | 27.6 | 27.6 | 28.1 | 28.1 | 28.1 |
| Catalyst Ti Loading | [wt %] | 4.1 | 4.1 | 4.1 | 4.1 | 4.1 |
| Reactor Temperature | [° C.] | 72 | 72 | 72 | 72 | 72 |
| Total Pressure | [psi] | 422 | 422 | 423 | 423 | 423 |
| C3 Partial Pressure | [psi] | 321 | 320 | 320 | 321 | 319 |
| Bed Weight | [kg] | 32.2 | 32.8 | 32.1 | 33.1 | 33.7 |
| Residence Time | [hr] | 1.9 | 2.3 | 2.1 | 2.4 | 2.0 |
| Superficial Gas Velocity | [m/s] | 0.38 | 0.37 | 0.40 | 0.40 | 0.40 |
| H2/C3 | [mol/mol] | 0.101 | 0.115 | 0.027 | 0.116 | 0.116 |
| Alkyl Type |  | TEA1 | TEA1 | TEA1 | TEA1 | TEA1 |
| MEED Type | [ALA/SCA] | IPM/NPTMS | —/NPTMS | OA/NPTMS | OA/NPTMS | PH/NPTMS |
| ALA/SCA composition | [mol/mol] | 60/40 | 0/100 | 90/10 | 90/10 | 90/10 |
| TEA1 Concentration | [wt %] | 2.5 | 2.5 | 2.5 | 2.5 | 2.5 |
| TEA1 Feed Rate | [cc/hr] | 98 | 205 | 108 | 131 | 126 |
| TEA1/Ti Feed Ratio | [mol/mol] | 50 | 49 | 50 | 49 | 50 |
| TEA1/MEED Feed Ratio | [mol/mol] | 7.0 | 5.9 | 3.8 | 3.8 | 3.8 |
| MEED Concentration | [wt %] | 1.0 | 1.0 | 1.0 | 1.0 | 1.0 |
| MEED Feed Rate | [cc/hr] | 70 | 125 | 107 | 129 | 114 |
| Production Rate | [kg/hr] | 17 | 15 | 15 | 14 | 17 |
| Catalyst Productivity | [kg/kg] | 49,993 | 34,080 | 48,928 | 47,790 | 50,740 |
| Properties of the polypropylene homopolymer examples | | | | | | |
| Melt Flow | [g/10 min] | 194.1 | 211.4 | 7.9 | 214.0 | 209.8 |
| Xylene Solubles | [wt %] | 2.3 | 1.7 | 1.2 | 2.0 | 1.9 |
| Ethylene Content | [wt %] |  |  |  |  |  |
| Ti Residuals | [ppm] | 0.8 | 1.2 | 0.8 | 0.9 | 0.8 |
| VOC by PV 3341 of the polypropylene homopolymer examples | | | | | | |
| VOC | [ppm] | 159 | 108 | 22 | 49 | 79 |
| VOC Reduction | [%] |  |  |  | 69% | 50% |

Additionally, in inventive example IE8, a propylene homopolymer was produced in a first pilot scale gas phase fluidized bed reactor using as MEED a 90 mol % PV/10 mol % NPTMS. The product from the first reactor was passed to a second gas phase fluidized bed reactor linked in series and contacted with propylene, ethylene, and hydrogen. The final product was an impact copolymer (ICP) comprising a propylene/ethylene rubber phase dispersed in a homopolymer matrix material. The detailed reactor conditions, impact copolymer properties, and VOC level are listed in Table 4.

TABLE 4

| IE8 | | | |
|---|---|---|---|
| Reactor 1 Conditions | | Reactor 2 Conditions | |
| Catalyst Feed Rate [cc/hr] | 1.1 | Reactor T [° C.] | 70 |
| Catalyst Slurry Solids | 27.0 | Total P [psi] | 295 |

TABLE 4-continued

IE8

| [wt %] | | C3 Partial P [psi] | 85 |
|---|---|---|---|
| Catalyst Ti Loading [wt %] | 4.2 | C2 Partial P [psi] | 37 |
| | | Residence t [hr] | 3.0 |
| Reactor T [° C.] | 72 | H2/C3 [mol/mol] | 0.015 |
| Total P [psi] | 424 | C2/C3 [mol/mol] | 0.432 |
| C3 Partial P [psi] | 320 | Cocatalyst | TEA1 |
| Residence t [hr] | 2.2 | ALA | IPM |
| H2/C3 [mol/mol] | 0.098 | SCA | NPTMS |
| Cocatalyst | TEA1 | ALA:SCA ratio | 60/40 |
| ALA | PV | TEA1 Feed Rate [cc/hr] | 288.375 |
| SCA | NPTMS | | |
| ALA:SCA ratio | 90/10 | MEED Feed Rate [cc/hr] | 51 |
| TEA1 Feed Rate [cc/hr] | 97 | Production Rate [kg/hr] | 13 |
| TEA1/Ti Feed Ratio [mol/mol] | 49 | Total Catalyst Productivity [kg/kg] | 42,857 |
| TEA1/MEED Feed Ratio [mol/mol] | 3.0 | | |
| MEED Feed Rate [cc/hr] | 119 | | |
| Catalyst Productivity [kg/kg] | 33,600 | | |

| Properties of the impact copolymer example | | VOC by PV 3341 of the impact copolymer example | |
|---|---|---|---|
| R1 Melt Flow [g/10 min] | 174.5 | VOC [ppm] | 22 |
| R1 Xylene Solubles [wt %] | 1.6 | | |
| R1 Ti Residuals [ppm] | 1.3 | | |
| R2 Melt Flow [g/10 min] | 67.0 | | |
| R2 Rubber Content (Fc) [wt %] | 19.1 | | |
| R2 Ethylene in Rubber (Ec) [wt %] | 40.6 | | |
| R1 Ethylene Content [wt %] | 7.8 | | |
| R2 Ti Residuals [ppm] | 1.0 | | |

As can be seen from the above examples, polyolefin homopolymers and copolymers can be manufactured according to the present invention with reduced VOC levels and good reactor operability even at high melt flows.

A further aspect of the invention is directed to a catalyst lifetime enhancing agent. In that regard, the compounds described above as being activity limiting agents may also be used as a catalyst lifetime enhancing agents (LEAs). A LEA increases the lifetime of the catalyst used during the production of polyolefins. For example, LEAs enable catalysts with a short lifetime to be used in polymerization processes with many reactors in series and thus long residence times. LEAs improve the production of impact copolymers by increasing the lifetime of the catalyst in a second reactor, thus enabling the production of higher rubber content (Fe) impact copolymers without use of TEA1, which can cause resin stickiness issues. Further, LEAs enable the production of polyolefins at very high catalyst productivity by using long residence times.

According to exemplary embodiments of the present invention, a composition is provided for use with a catalyst for polymerization of mixtures comprising an SCA comprising at least one silicon-containing compound containing at least one C1-C10 alkoxy group bonded to a silicon atom and one or more LEA compounds of C2-C13 mono- or polycarboxylic esters of aliphatic C2-C7 carboxylic acids and inertly substituted derivatives thereof. In the same or different embodiments, a catalyst composition is provided for polymerization of mixtures comprising an olefin. The catalyst composition includes a polymerization catalyst, an SCA, and a LEA. The description for SCA/ALA mixtures above applies to SCA/LEA mixtures.

EXAMPLES

Bed accumulation tests: Bed accumulation tests were used in comparative and inventive examples to determine the exponential decay constant (kd) for the exponential decay function ($e^{-kd \cdot t}$) that can be fitted to the catalyst activity decay with time. From the decay constant, the catalyst lifetime is determined by the relationship given by equation (4).

$$\text{Lifetime} = \frac{1}{kd} \quad (4)$$

Therefore, the lifetime is the time within which the catalyst activity decays by a factor of approximately 63%.

To perform the bed accumulation test, propylene, a Ziegler-Natta catalyst composition of a titanium compound and an organoaluminum co-catalyst, a mixed external electron donor (MEED) comprising a mixture of a silane SCA and an alkyl ester ALA (comparative examples) or LEA (inventive examples) were introduced into a pilot plant sized fluidized bed gas phase reactor in accordance with Table 5 and allowed to react to produce polypropylene samples. For the silane SCA component in the MEED, n-propyltrimethoxysilane (NPTMS) was used. For the alkyl ester ALA component, isopropyl myristate (IPM) was used in the comparative examples. Pentyl valerate (PV) was used as the LEA in the inventive examples. To perform the test, the reactor was first allowed to reach steady state production conditions with polymer fluidized bed weight W0. Then, at a predetermined time, the catalyst, co-catalyst and MEED feeds to the reactor are stopped. At the same time, removal of product from the reactor is stopped so that subsequent production is held in the reactor and accumulates so that the weight of polymer material in the reactor increases. The reactor was held in this state for a time, tBAT, of greater than 2 hours and the weight of material produced during each hour following the start of the test was measured by determining the increase in fluidized bed weight during that time using the difference of the pressure between pressure taps below and above the fluidized bed. The weight produced during each hour following the start of the test is plotted against time and this plot is fitted to an exponential decay with decay constant kd. The catalyst lifetime is then obtained from the decay constant using Equation (4) above.

TABLE 5

| | | CE8 | IE9 | IE10 | CE9 | IE11 |
|---|---|---|---|---|---|---|
| Preparation of the polypropylene homopolymer examples | | | | | | |
| Reactor Conditions | | | | | | |
| Catalyst Type | | Cat0 | Cat0 | Cat0 | Cat1 | Cat1 |
| Catalyst Feed Rate | [cc/hr] | 1.9 | 1.6 | 2.0 | 2.7 | 0.9 |
| Catalyst Slurry Solids | [wt %] | 27.0 | 27.0 | 27.0 | 15.0 | 15.0 |

TABLE 5-continued

|  |  | CE8 | IE9 | IE10 | CE9 | IE11 |
|---|---|---|---|---|---|---|
| Catalyst Ti Loading | [wt %] | 4.2 | 4.2 | 4.2 | 3.1 | 3.1 |
| Reactor Temperature | [° C.] | 72 | 72 | 72 | 72 | 72 |
| Total Pressure | [psi] | 424 | 423 | 423 | 419 | 424 |
| C3 Partial Pressure | [psi] | 320 | 320 | 320 | 320 | 320 |
| Bed Weight | [kg] | 31.7 | 31.9 | 33.2 | 32.0 | 23.3 |
| Residence Time | [hr] | 2.1 | 1.9 | 2.8 | 2.3 | 1.9 |
| Superficial Gas Velocity | [m/s] | 1.23 | 1.12 | 1.30 | 1.20 | 1.01 |
| H2/C3 | [mol/mol] | 0.080 | 0.080 | 0.085 | 0.063 | 0.046 |
| C2/C3 | [mol/mol] | 0.000 | 0.000 | 0.000 | 0.000 | 0.000 |
| Alkyl Type |  | TEA1 | TEA1 | TEA1 | TEA1 | TEA1 |
| MEED Type | [ALA/SCA] | IPM/NPTMS | PV/NPTMS | PV/NPTMS | IPM/NPTMS | PV/NPTMS |
| ALA/SCA composition | [mol/mol] | 60/40 | 90/10 | 60/40 | 60/40 | 90/10 |
| TEA1 Concentration | [wt %] | 2.5 | 2.5 | 2.5 | 2.5 | 2.5 |
| TEA1 Feed Rate | [cc/hr] | 173 | 141 | 177 | 97 | 33 |
| TEA1/Ti Feed Ratio | [mol/mol] | 50 | 50 | 50 | 50 | 50 |
| TEA1/MEED Feed Ratio | [mol/mol] | 3.8 | 3.5 | 3.8 | 3.8 | 3.8 |
| MEED Concentration | [wt %] | 1.0 | 1.0 | 1.0 | 1.0 | 1.0 |
| MEED Feed Rate | [cc/hr] | 225 | 152 | 172 | 128 | 32 |
| Production Rate | [kg/hr] | 15 | 17 | 13 | 14 | 12 |
| Catalyst Productivity | [kg/kg] | 38,532 | 43,299 | 35,000 | 29,340 | 29,065 |
| Properties of the polypropylene examples | | | | | | |
| Melt Flow | [g/10 min] | 94.8 | 100.3 | 103.6 | 180.2 | 206.0 |
| Xylene Solubles | [wt %] | 1.5 | 1.8 | 1.5 | 1.6 | 1.6 |
| Ethylene Content | [wt %] | 0.0 | 0.0 | 0.0 | 0.0 | 0.0 |
| Ti Residuals | [ppm] | 1.1 | 1.0 | 1.2 | 1.1 | 1.1 |
| Lifetime of the polypropylene examples | | | | | | |
| Lifetime | [hr] | 1.5 | 2.3 | 2.9 | 1.5 | 2.3 |
| Lifetime Increase | [%] | — | 56% | 97% | — | 56% |

As shown in Table 5, the LEA increases the catalyst lifetimes of the inventive examples by more than 50% of the lifetime of the corresponding comparative examples. As can be seen from the above examples, polyolefin homopolymers and copolymers can be manufactured according to the present invention with increased catalyst lifetimes.

This has been a description of the present invention along with the various methods of practicing the present invention. However, the invention itself should only be defined by the appended claims.

What is claimed is:

1. A composition comprising a propylene homopolymer and a C2-C13 mono- or polycarboxylic ester of aliphatic C2-C7 carboxylic acids and inertly substituted derivatives thereof, wherein the composition has a melt flow greater than 100 g/10 min, as measured in accordance with ASTM D-1238-01 at 230° C. with a 2.16 kg weight of propylene based polymers.

2. The composition of claim 1, wherein the composition has a VOC content less than 80 ppm, as measured in accordance with VW standard PV 3341.

3. The composition of claim 1, wherein the composition has a VOC content less than 25 ppm, as measured in accordance with VW standard PV 3341, and a melt flow less than 10 g/10 min, as measured in accordance with ASTM D-1238-01 at 230° C. with a 2.16 kg weight of propylene based polymers.

4. A propylene impact copolymer composition comprising:
a propylene-based polymer;
a propylene/ethylene copolymer dispersed within the propylene-based polymer; and
a C2-C13 mono- or polycarboxylic ester of aliphatic C2-C7 carboxylic acids and inertly substituted derivatives thereof, wherein the composition has a melt flow greater than 50 g/10 min, as measured in accordance with ASTM D-1238-01 at 230° C. with a 2.16 kg weight of propylene based polymers.

5. The composition of claim 4, wherein the composition has a VOC content less than 30 ppm, as measured in accordance with VW standard PV 3341.

6. A polymerization process comprising:
contacting, under polymerization conditions, propylene with a catalyst composition comprising a C2-C13 mono- or polycarboxylic ester of aliphatic C2-C7 carboxylic acids and inertly substituted derivatives thereof in a first polymerization reactor;
forming an active propylene-based polymer;
contacting, under polymerization conditions, the active propylene-based polymer with at least one olefin in a second polymerization reactor; and
forming the composition of claim 4.

7. An article comprising the composition of claim 1.

8. An article comprising the polypropylene impact copolymer of claim 4.

* * * * *